United States Patent
Ki et al.

(10) Patent No.: US 8,422,505 B2
(45) Date of Patent: Apr. 16, 2013

(54) METHOD FOR PROCESSING MAC PROTOCOL DATA UNIT IN A WIRELESS COMMUNICATION SYSTEM

(75) Inventors: Sun Hee Ki, Gyeonggi-do (KR); Sung Hoon Jung, Gyeonggi-do (KR); Seung June Yi, Gyeonggi-do (KR); Sung Duck Chun, Gyeonggi-do (KR); Sung Jun Park, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 235 days.

(21) Appl. No.: 12/972,597

(22) Filed: Dec. 20, 2010

(65) Prior Publication Data

US 2011/0164560 A1  Jul. 7, 2011

Related U.S. Application Data

(60) Provisional application No. 61/293,185, filed on Jan. 7, 2010.

(30) Foreign Application Priority Data

Sep. 16, 2010 (KR) .................. 10-2010-0090952

(51) Int. Cl.
   *H04L 12/28* (2006.01)
(52) U.S. Cl.
   USPC ........................................... 370/394
(58) Field of Classification Search .................. None
   See application file for complete search history.

(56) References Cited

U.S. PATENT DOCUMENTS

| | | | |
|---|---|---|---|
| 2004/0037224 A1* | 2/2004 | Choi et al. ............... | 370/235 |
| 2007/0091810 A1* | 4/2007 | Kim et al. ............... | 370/236 |
| 2008/0170522 A1* | 7/2008 | Sammour et al. ......... | 370/310 |
| 2011/0223904 A1* | 9/2011 | Fan et al. ............... | 455/422.1 |

* cited by examiner

*Primary Examiner* — Anh-Vu Ly (74) *Attorney, Agent, or Firm* — Morgan, Lewis & Bockius LLP (57) ABSTRACT

A method and apparatus for processing a MAC PDU in a wireless communication system are disclosed. The method includes segmenting a MAC PDU into a first MAC PDU segment and a second MAC PDU segment, transmitting the first MAC PDU segment to a receiver, and discarding the second MAC PDU segment not to be transmitted to the receiver, if the transmission of the first MAC PDU segment is failed.

9 Claims, 11 Drawing Sheets

FIG. 1

(PRIOR ART)

FIG. 2

(PRIOR ART)

METHOD FOR PROCESSING MAC PROTOCOL DATA UNIT IN A WIRELESS COMMUNICATION SYSTEM

This application claims the benefit of Korean Patent Application No. 10-2010-0090952, filed on Sep. 16, 2010, which is hereby incorporated by reference as if fully set forth herein.

This application also claims the benefit of U.S. Provisional Application Ser. No. 61/293,185, filed on Jan. 7, 2010, the content of which is hereby incorporated by reference herein in their entirety.

BACKGROUND OF THE INVENTION

1. Field of the Invention

The present invention relates to a wireless communication system, and more particularly, to a method and apparatus for processing a Medium Access Control (MAC) Protocol Data Unit (PDU) in a wireless communication system.

2. Discussion of the Related Art

Figure 1:
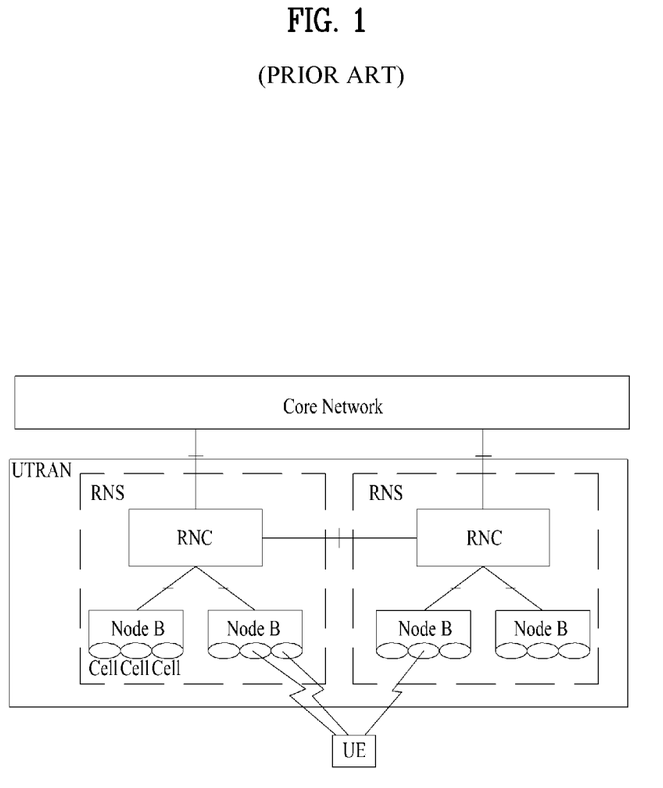
FIG. 1 illustrates a Universal Mobile Telecommunications System (UMTS) network configuration.

With reference to FIG. 1, a Universal Mobile Telecommunications System (UMTS) network configuration will be described below.

FIG. 1 illustrates a UMTS network configuration. Referring to FIG. 1, a UMTS system includes a User Equipment (UE), a UMTS Terrestrial Radio Access Network (UTRAN), and a Core Network (CN). The UTRAN includes one or more Radio Network Sub-systems (RNSs) each having a Radio Network Controller (RNC) and one or more Node Bs managed by the RNC. A Node B manages one or more cells.

Figure 2:
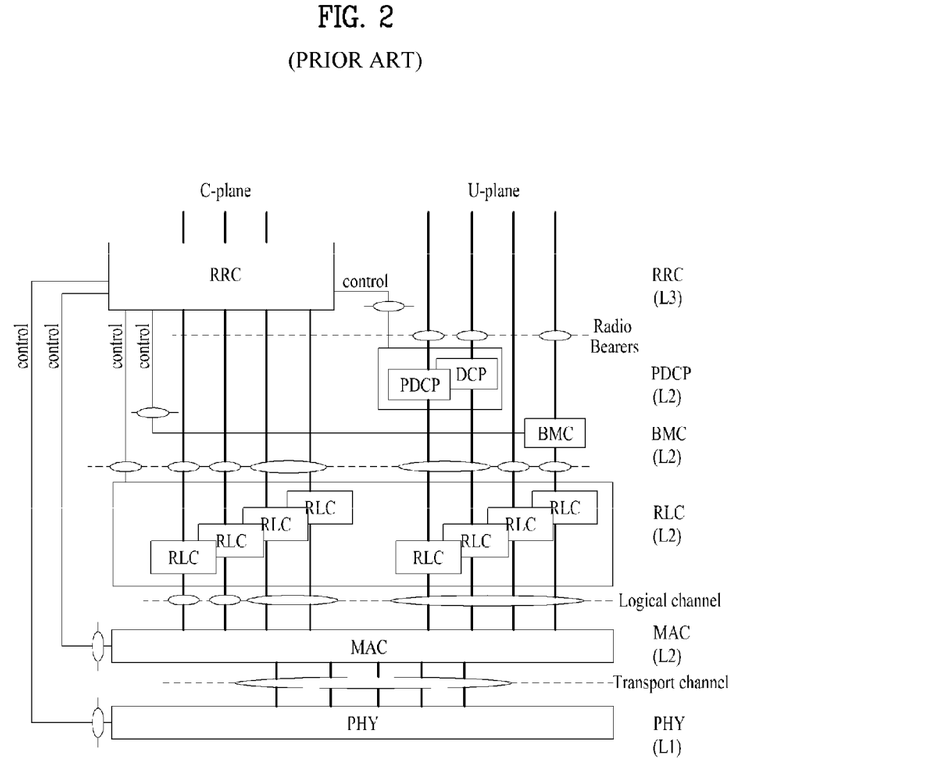
FIG. 2 illustrates a radio protocol architecture for UMTS.

A radio protocol architecture for the UMTS system will be described with reference to FIG. 2. FIG. 2 illustrates a radio protocol architecture for UMTS. Radio protocol layers are defined in pairs for a UE and a UTRAN, for wireless data transmission. Layer 1 (or L1), the PHYsical (PHY) layer transmits data on a radio link in various wireless transmission techniques. The PHY layer is connected to its higher layer, the MAC layer via transport channels. The transport channels are divided into dedicated transport channels and common transport channels depending on whether they are shared.

The MAC layer, the Radio Link Control (RLC) layer, the Packet Data Convergence Protocol (PDCP) layer, and the Broadcast and Multicast Control (BMC) layer are defined at Layer 2 (or L2). The MAC layer maps logical channels to transport channels and multiplexes a plurality of logical channels onto one transport channel.

The MAC layer is connected to a higher layer, the RLC layer via logical channels. The logical channels are divided into control channels and traffic channels according to the types of information that they carry. The control channels carry control-plane information and the traffic channels carry user-plane information. The control channels include a Common Control Channel (CCCH) carrying common control information, a Dedicated Control Channel (DCCH) carrying control information to a specific UE, a Broadcast Control Channel (BCCH) carrying system information common to a cell, and a Paging Control Channel (PCCH) carrying a paging message. The traffic channels include a Dedicated Traffic Channel (DTCH) carrying user-plane data to a specific UE.

The MAC layer is branched into a MAC-b sublayer, a MAC-d sublayer, a MAC-c/sh sublayer, a MAC-hs/ehs sublayer, and a MAC-e/es or MAC-i/is sublayer depending on the types of specific transport channels that they manage. The MAC-b sublayer manages a Broadcast Channel (BCH) that broadcasts system information, the MAC-c/sh sublayer manages a Forward Access Channel (FACH) that is a common transport channel shared among different UEs, and the MAC-d sublayer manages a Dedicated Channel (DCH) that is a dedicated transport channel for a specific UE. The MAC-hs/ehs sublayer manages a High Speed Downlink Shared Channel (HS-DSCH) that is a transport channel used to transmit high-speed downlink data, and the MAC-e/es or MAC-i/is sublayer manages an Enhanced Dedicated Channel (E-DCH) that is a transport channel used to transmit high-speed uplink data.

The RLC layer ensures the Quality of Service (QoS) of Radio Bearers (RBs) and is responsible for data transmission. The RLC layer has one or two independent RLC entities for each RB in order to ensure QoS. To support various QoS levels, the RLC layer provides three RLC modes, Transparent Mode (TM), Unacknowledged Mode (UM), and Acknowledged Mode (AM). In addition, the RLC layer controls a data size to suit radio data transmission at a lower layer. For controlling a data size, the RLC layer segments or concatenates data received from a higher layer.

The PDCP layer is located above the RLC layer. The PDCP layer enables efficient data transmission in IP packets such as IP version 4 (IPv4) or IP version 6 (IPv6) packets on a radio link having a relatively narrow bandwidth. For this purpose, the PDCP layer performs header compression. Since only necessary information is transmitted in the header of data header through header compression, the transmission efficiency of the radio link is increased. The PDCP layer exists mainly in a Packet Switched (PS) domain because header compression is it basic function. To provide an efficient header compression function for each PS service, one PDCP entity is defined for each RB. However, if the PDCP layer exists in a Circuit Switched (CS) domain, the PDCP layer does not provide the header compression function.

The BMC layer is also above the RLC layer, for scheduling a cell broadcast message and broadcasting the cell broadcast message to UEs within a specific cell.

The Radio Resource Control (RRC) layer, which is located at the lowest part of Layer 3 (or L3), is defined only on the control plane. The RRC layer is involved in establishing, reestablishing, and releasing RBs, controls L1 or L2 parameters, and controls logical channels, transport channels and physical channels. An RB refers to a logical path formed at L1 and L2 in the protocol stack, for data transmission between a UE and a UTRAN. In general, setup of an RB is the process of specifying radio protocol layers and channels necessary to provide a specific service and setting specific parameters and an operation scheme.

Figure 3:
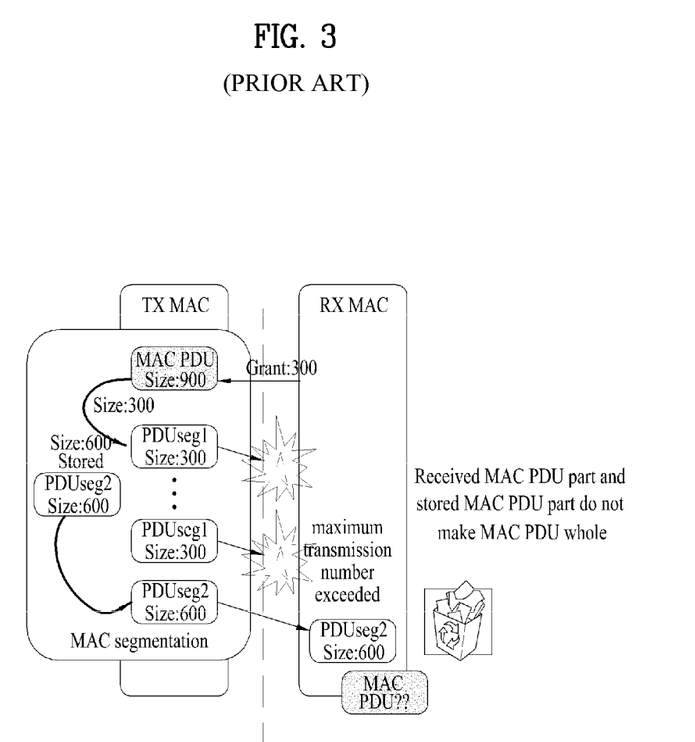
FIG. 3 illustrates an exemplary conventional Medium Access Control (MAC) Protocol Data Unit (PDU) transmission method.
Figure 4:
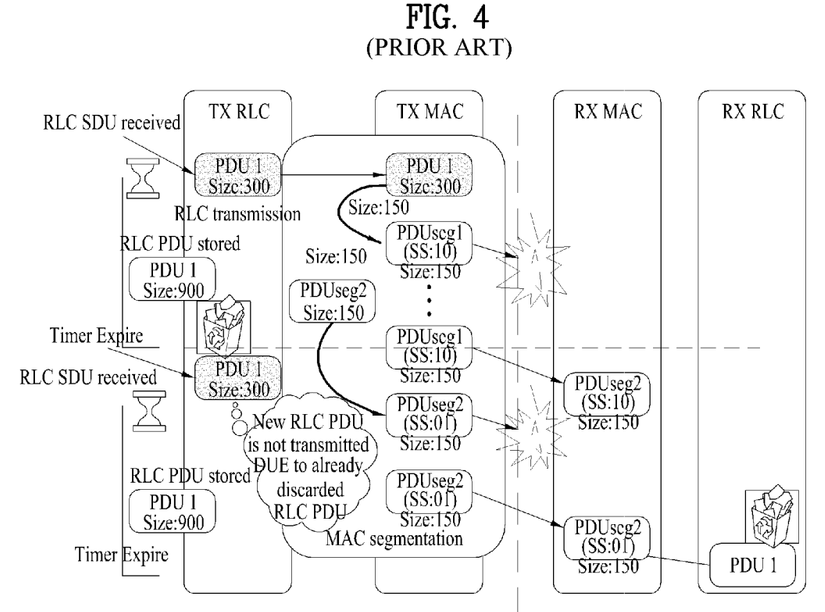
FIG. 4 illustrates another exemplary conventional MAC PDU transmission method.

With reference to FIGS. 3 and 4, a conventional MAC PDU transmission method will be described. FIG. 3 illustrates an exemplary conventional MAC PDU transmission method.

Conventionally, if a MAC PDU or a segment of a MAC PDU is too large for a Transport Block (TB), a MAC segmentation entity of a transmitter segments the MAC PDU or the MAC PDU segment and constructs a TB with a segment, while storing the other segments. A Hybrid Automatic Repeat reQuest (HARQ) entity of the transmitter transmits the TB to a receiver. If the HARQ entity fails to receive an ACKnowledgement (ACK) from the receiver after transmitting the TB a maximum retransmission number of times, the HARQ entity discards the TB buffered in an HARQ process buffer. However, the remainder of the MAC PDU corresponding to the failed TB may be retained in the MAC segmentation entity and thus the transmitter may transmit the remainder of the MAC PDU to the receiver.

Even though the receiver successfully receives the remainder of the MAC PDU, it cannot assemble the whole MAC PDU because of the failed MAC PDU segment. Accordingly, the receiver discards the successfully received part of the MAC PDU. This means that radio resources are dissipated due to unnecessary data transmission.

Referring to FIG. 3, in the case where a first segment of a MAC PDU is failed in HARQ transmission, a second segment of the MAC PDU buffered in an HARQ process buffer may be transmitted. Even though the receiver receives the second segment successfully, the receiver cannot construct the whole MAC PDU because of the failed first segment. Therefore, the receiver discards even the successfully received second segment.

FIG. 4 illustrates another exemplary conventional MAC PDU transmission method.

Conventionally, when receiving an RLC Service Data Unit (SDU) from a higher layer, a UE expects successful transmission of the RLC SDU within a maximum delay time. Therefore, upon receipt of RLC SDUs, the UE activates a discard timer Timer_Discard, constructs an RLC PDU with the received RLC SDUs, and expects the RLC PDU to be transmitted until before expiration of the discard timer Timer_Discard. Hence, upon expiration of the discard timer Timer_Discard, the UE clears the RLC SDU from a buffer.

Because the discard timer Timer_Discard is set to a maximum delay time allowed for the RLC SDU, a network discards the RLC SDU even though the network receives the RLC SDU after the maximum delay time. Therefore, the UE also discards the RLC SDU upon expiration of the discard timer Timer_Discard. The reason for discarding the RLC SDU is to prevent the overflow of the RLC buffer and the time delay of new data to be transmitted that might be caused by the data received after a time delay and thus not processed.

Even though the deletion of the RLC SDU from the RLC SDU buffer upon expiration of the discard timer Timer_Discard, there may remain MAC PDU segments yet to be transmitted in a MAC-i/is segmentation entity of the MAC layer in the UE. Upon receipt of a new RLC SDU, the UE transmits an RLC PDU constructed with the new RLC SDU after transmitting the remaining MAC PDU segments. That is, although the UE wants to transmit a second RLC SDU after discarding a first RLC SDU, the second RLC SDU may have an additional time delay due to the transmission of the MAC PDU segments yet to be transmitted in the MAC layer.

As described above, the conventional MAC PDU transmission methods may dissipate radio resources and cause a time delay during transmission because a UE transmits an unnecessary MAC PDU segment.

SUMMARY OF THE INVENTION

Accordingly, the present invention is directed to a method for processing a MAC PDU in a wireless communication system that substantially obviates one or more problems due to limitations and disadvantages of the related art.

An object of the present invention is to provide a method for processing a PDU in such a manner that radio resources are efficiently used and a time delay is prevented.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for processing a MAC PDU at a MAC layer of a transmitter in a wireless communication system includes segmenting a MAC PDU into a first MAC PDU segment and a second MAC PDU segment, transmitting the first MAC PDU segment to a receiver, and discarding the second MAC PDU segment that has not been transmitted to the receiver, if the transmission of the first MAC PDU segment is failed.

The MAC PDU may be segmented according to an amount of available resources.

The available resources may be determined according to a Transport Block (TB) size.

The available resources may be determined according to space of the TB determined by a selected Transport Format Combination (TFC).

The method may further include storing the second MAC PDU segment.

The method may further include discarding the first MAC PDU segment.

The method may further include receiving an indication indicating that an RLC SDU related to the MAC PDU has been discarded from an RLC layer, and the second MAC PDU segment may be discarded according to the indication.

The RLC SDU may be discarded based on a discard timer, Timer_Discard.

In another aspect of the present invention, a transmitter including a MAC layer in a wireless communication system includes a segmentation entity for segmenting a MAC PDU into a first MAC PDU segment and a second MAC PDU segment, and a transmission entity for transmitting the first MAC PDU segment to a receiver. If the transmission of the first MAC PDU segment is failed, the second MAC PDU segment that has not been transmitted to the receiver is discarded.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a Universal Mobile Telecommunications System (UMTS) mobile communication system is being used. However, the description is applicable to any other mobile communication system except for specific features inherent to the UMTS system.

In some instances, known structures and devices are omitted, or are shown in block diagram form focusing on important features of the structures and devices, so as not to obscure the concept of the present invention. The same reference numbers will be used throughout this specification to refer to the same or like parts.

In the following description, a User Equipment (UE) is assumed to refer to a mobile or fixed user end device such as a Mobile Station (MS), etc. and the term 'Base Station (BS)' is assumed to refer to any node of a network end, such as a Node B, an enhanced Node B (eNB or eNode B), etc., communicating with a UE.

Figure 5:
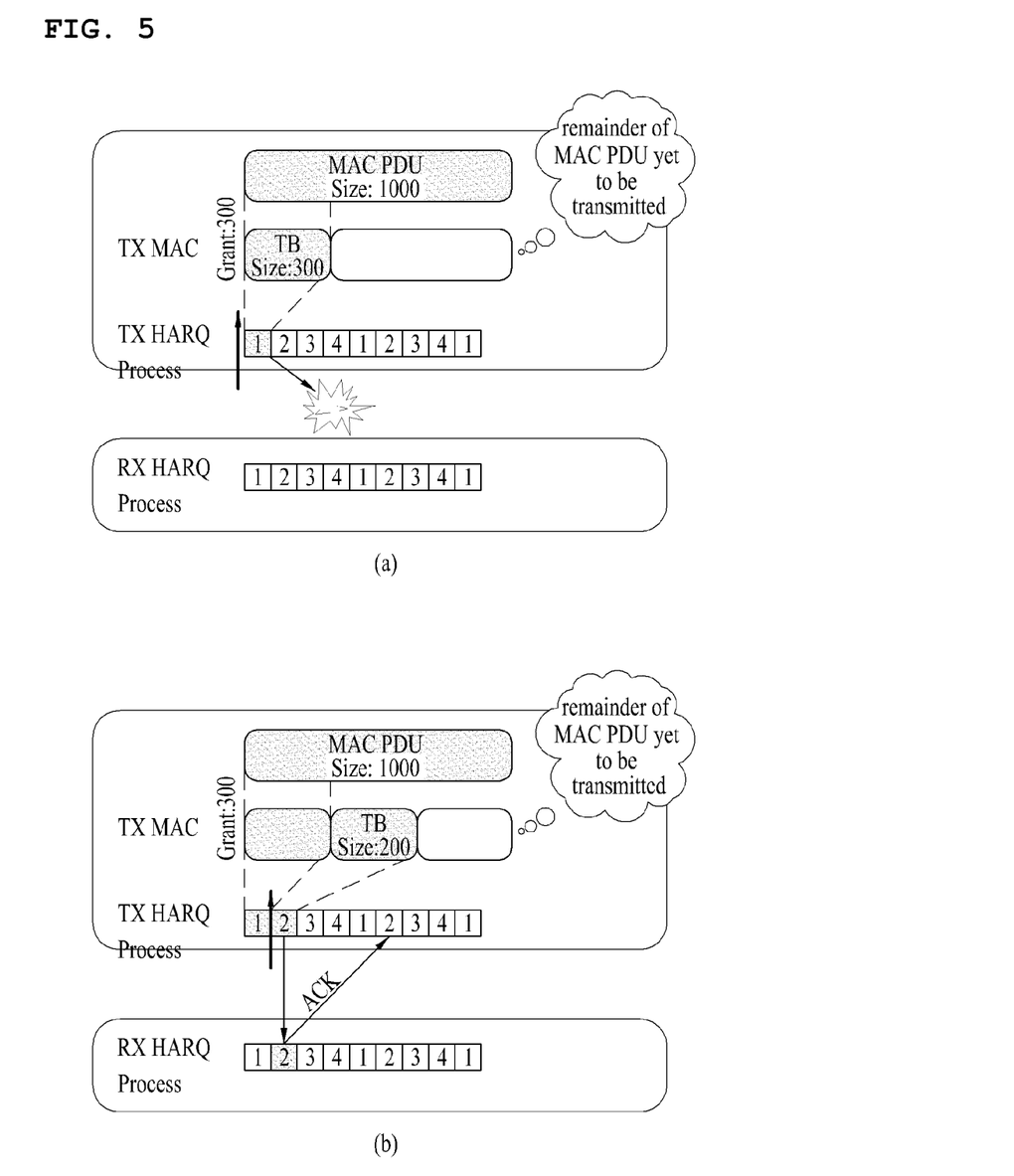
FIG. 5 illustrates an operation for segmenting a MAC PDU.

A process for segmenting a Medium Access Control (MAC) Protocol Data Unit (PDU) will be described below with reference to FIG. 5. FIG. 5 illustrates an operation for segmenting a MAC PDU.

Upon receipt of a grant from a network according to a radio environment, the MAC layer of a UE determines the size of a Transport Block (TB) to be transmitted during the next Transmission Time Interval (TTI) according to the grant. The grant specifies the size of data that the UE can transmit during the next TTI, determined based on a maximum available transmission power by the network. If a MAC PDU is too large for a single TB, a MAC segmentation entity of the UE segments the MAC PDU to the determined TB size. The remainder of the MAC PDU is stored in the MAC segmentation entity.

For instance, in FIG. 5(a), a MAC PDU is 1000 bits long and a TB size is 300 bits. Thus the UE segments the MAC PDU to the size of 300 bits, configures a 300-bit TB to be transmitted during a current TTI, buffers the TB in an HARQ process buffer, and then attempts an HARQ transmission of the TB. The MAC segmentation entity of the UE stores the remainder of the MAC PDU.

Referring to FIG. 5(b), if a part of the MAC PDU still remains yet to be transmitted in the MAC segmentation entity and is too large for a single TB, the MAC segmentation entity segments the part of the MAC PDU to a TB size, buffers a MAC PDU segment to be transmitted in an HARQ process buffer, and attempts an HARQ transmission of the MAC PDU segment. The remainder of the MAC PDU yet to be transmitted is stored in the MAC segmentation entity.

Now, a description will be given of HARQ transmission with reference to FIGS. 6 and 7.

HARQ is a scheme of increasing the transmission efficiency of packet data by reducing retransmission requests that a UE issues to a BS due to a poor radio channel environment or other factors. Basically, an error check is performed on received data using a simple error detection code such as a Cyclic Redundancy Check (CRC). Upon detection of an error in the received data, the UE requests a retransmission of the data, thus attempting to correct the error.

For example, if a transmitter transmits a first TB on a physical channel to a receiver and the receiver successfully receives the first TB, the receiver transmits an ACK for the first TB to the transmitter. On the contrary, if the receiver fails to receive the first TB, the receiver transmits a NACK for the first TB to the transmitter. Upon receipt of the ACK from the receiver, the transmitter discards the first TB from an HARQ process buffer and transmits a second TB. On the other hand, upon receipt of the NACK for the first TB from the receiver, the transmitter retransmits the first TB buffered in an HARQ process buffer to the receiver.

However, the retransmission cannot continue indefinitely in the case where the UE stays in a poor channel state or data to be transmitted from the UE is sensitive to delay. Therefore, the system notifies the transmitter of a maximum allowed retransmission number and thus the transmitter attempts retransmission up to the maximum retransmission number of times. If the transmitter fails to receive an ACK for a first TB even though it retransmits the first TB the maximum retransmission number of times, the transmitter discards the first TB from the HARQ process buffer without attempting to transmit the first TB any longer. Then the transmitter transmits a second TB. This is called HARQ transmission failure.

Figure 6:
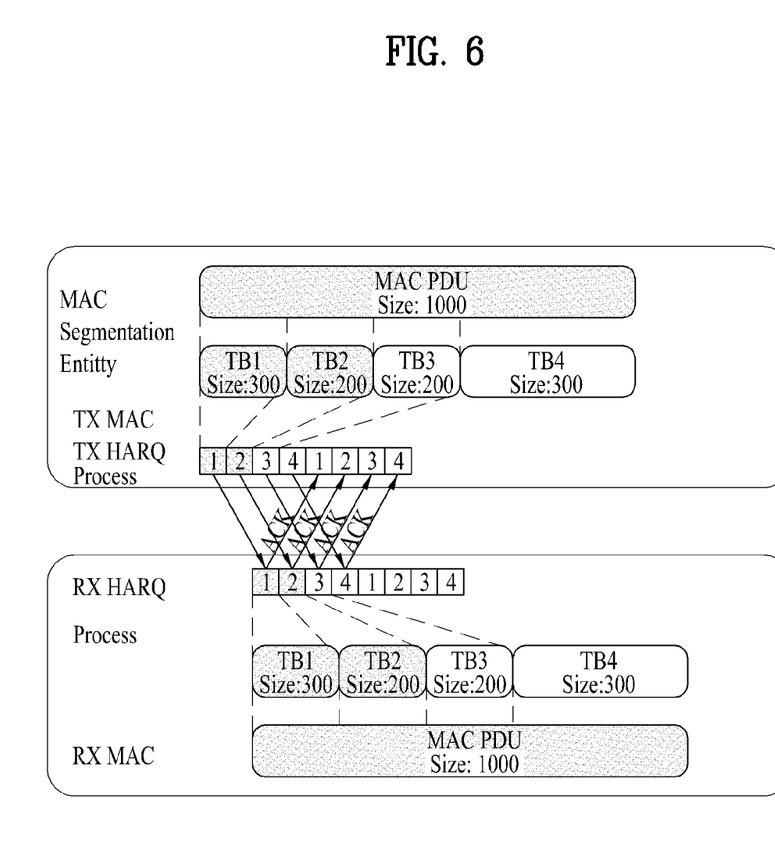
FIG. 6 illustrates successful reception of a MAC PDU at a receiver, when the MAC PDU is transmitted separately in a plurality of Transport Blocks (TBs).
Figure 7:
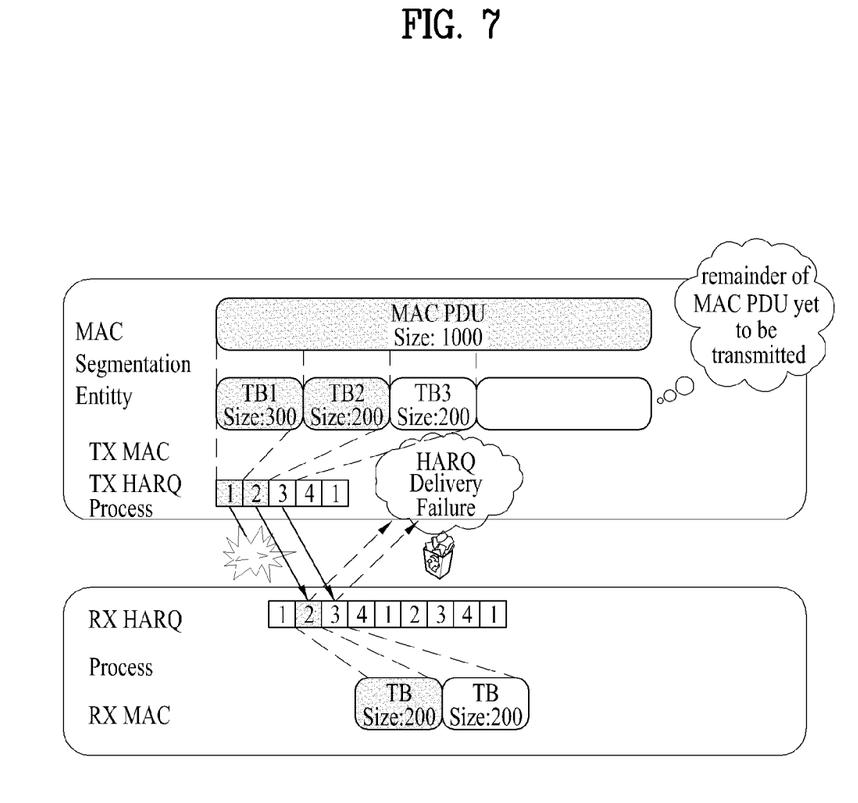
FIG. 7 illustrates failed reception of a MAC PDU at a receiver.

FIG. 6 illustrates successful reception of a MAC PDU at a receiver, when the MAC PDU is transmitted separately in a plurality of TBs and FIG. 7 illustrates failed reception of a MAC PDU at the receiver.

Referring to FIGS. 6 and 7, a MAC segmentation entity of a transmitter segments a MAC PDU into a plurality of TBs and transmits the TBs to a receiver in an HARQ scheme. If the MAC PDU is 1000 bits long, a first 300-bit MAC PDU segment is buffered in a first HARQ process buffer and transmitted in a first HARQ process. A second 200-bit MAC PDU segment is buffered in a second HARQ process buffer and transmitted in a second HARQ process.

In the illustrated case of FIG. 6, all TBs of a MAC PDU are successful in HARQ transmission. The transmitter sequentially transmits first to fourth segments (i.e. first to fourth TBs) that form the MAC PDU. Upon receipt of ACKs for the TBs of the MAC PDU, the transmitter discards the MAC PDU segments from the HARQ process buffers. Then the transmitter attempts to transmit the next MAC PDU wholly or partially because the HARQ process buffers do not have any buffered TB. After sequentially receiving all of the TBs from the transmitter, a MAC segmentation entity of the receiver can assemble a whole MAC PDU with the TBs.

In the illustrated case of FIG. 7, the transmitter buffers a first segment TB1 of a MAC PDU in a first HARQ process buffer and transmits the first segment TB1 to the receiver, only to fail. Then the transmitter buffers a second segment TB2 of the MAC PDU in a second HARQ process buffer and transmits the second segment TB2 to the receiver. The transmitter buffers a third segment TB3 of the MAC PDU in a third HARQ process buffer and transmits the third segment TB3 to the receiver. The transmitter buffers a fourth segment TB4 of the MAC PDU in a fourth HARQ process buffer and transmits the fourth segment TB4 to the receiver. If the transmitter fails to receive an ACK for the first segment TB1 from the receiver even after retransmitting the first segment TB1 a maximum retransmission number of times, the transmitter discards the first segment TB1 from the first HARQ process buffer, determining HARQ delivery failure. Upon receipt of an ACK for each of the second and third segments TB2 and TB3 from the receiver, the transmitter discards the second and third segments TB2 and TB3 from the HARQ process buffers. Because the receiver has not received the first segment TB1, it cannot assemble a whole MAC PDU even though it receives the other TBs.

Now a description will be given of an SDU discard function. The SDU discard function is used to discard RLC PDUs from an RLC PDU buffer, when the RLC PDUs have not been transmitted successfully within a predetermined time or after a predetermined number of transmissions. The SDU discard function serves the purpose of avoiding overflow of an RLC PDU buffer. To perform the SDU discard function, a plurality of operation modes are defined and an SDU discard function to be performed is signaled to each RLC entity by the RRC layer. The SDU discard function may be performed in a timer-based manner with explicit signaling, a timer-based manner without signaling, a maximum transmission number-based manner, or an RLC reset manner without discarding an RLC SDU after a maximum number of transmissions.

The timer-based discard scheme is used to transmit data within a maximum delay time defined by QoS. QoS means the service quality of a service that a UE receives. Major factors affecting QoS are a maximum delay, an error rate, a bit rate, etc. To transmit data within a maximum delay defined by QoS, the RLC layer expects to transmit an RLC SDU received from a higher layer within the maximum delay time. If RLC PDUs constructed with the RLC SDU are not transmitted until the maximum delay time elapses, the RLC layer discards the RLC SDU to reduce distribution within a channel rate. This is done to prevent a buffer overflow. As a result, the RLC SDU loss rate of a connection may increase.

Upon receipt of an RLC SDU from a higher layer, the transmitter activates a discard timer Timer_Discard. If the transmitter fails in transmitting the RLC SDU until the discard timer Timer_Discard expires, it discards the RLC SDU. In the timer-based discard scheme with explicit signaling, when an RLC SDU is discarded upon expiration of the discard timer Timer_Discard, the transmitter transmits a Move Receive Window (MRW) SuperField (SUFI) in a status PDU to the receiver. Upon receipt of the MRW SUFI, the receiver discards RLC PDUs carrying the RLC SDU and updates a reception window.

In the scheme of discarding an RLC SDU after a maximum number of transmissions, if the transmitter fails to transmit an RLC PDU constructed with an RLC SDU despite a maximum number of transmissions, the transmitter discards the RLC PDU. The transmitter may then instruct the receiver to move a reception window as is done in the timer-based discard scheme with explicit signaling, or may reset RLC entities of the transmitter and the receiver through RLC reset.

A PDU processing method according to an embodiment of the present invention will be described below with reference to FIGS. 8 and 9.

In accordance with the embodiment of the present invention, the transmitter discards a whole PDU if it fails in HARQ transmission of even a segment of the PDU.

Figure 8:
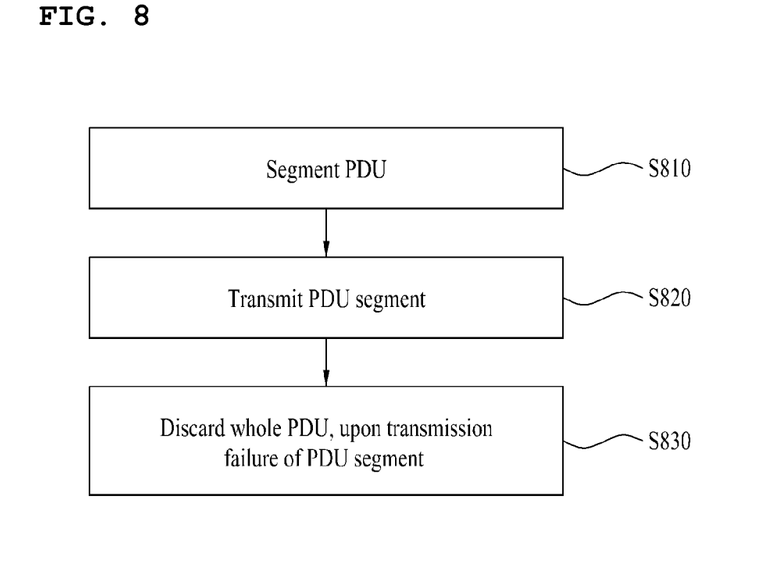
FIG. 8 is a flowchart illustrating a PDU processing method according to an embodiment of the present invention.

FIG. 8 is a flowchart illustrating a PDU processing method according to an embodiment of the present invention.

Referring to FIG. 8, the transmitter segments a PDU into two PDU segments according to the size of resources (S810). Specifically, the UE generates a first PDU segment of a size suitable for data transmission in available resources by segmenting the PDU to the size of the available resources. The remainder of the PDU is a second PDU segment. The available resources are determined according to a TB size. That is, the available resources depend on the space of a TB determined by selection of a Transport Format Combination (TFC). In the transmitter, the MAC layer segments the PDU into two PDU segments and transmits the first PDU segment to an HARQ entity, while storing the second PDU segment in a MAC segmentation entity.

If a PDU segment is present in the MAC segmentation entity of the transmitter, the MAC layer of the transmitter segments the PDU segment into two PDU segments according to the size of available resources and transmits a PDU segment of a size suitable for transmission in the resources to the HARQ entity.

The transmitter transmits the first PDU segment to the receiver (S820). If the transmitter fails to receive an ACK for the first PDU segment, it retransmits the first PDU segment a maximum retransmission number of times. When the transmitter fails to receive an ACK for the first PDU segment even after the maximum number of retransmissions, the transmitter does not retransmit the first PDU segment any longer. This is called HARQ delivery failure.

In the case where the transmitter fails to receive an ACK for the first PDU segment even after the maximum number of retransmissions, the transmitter discards the whole PDU (S830). FIG. 9 illustrates an exemplary method for processing a PDU when transmission of a PDU segment is failed.

Figure 9:
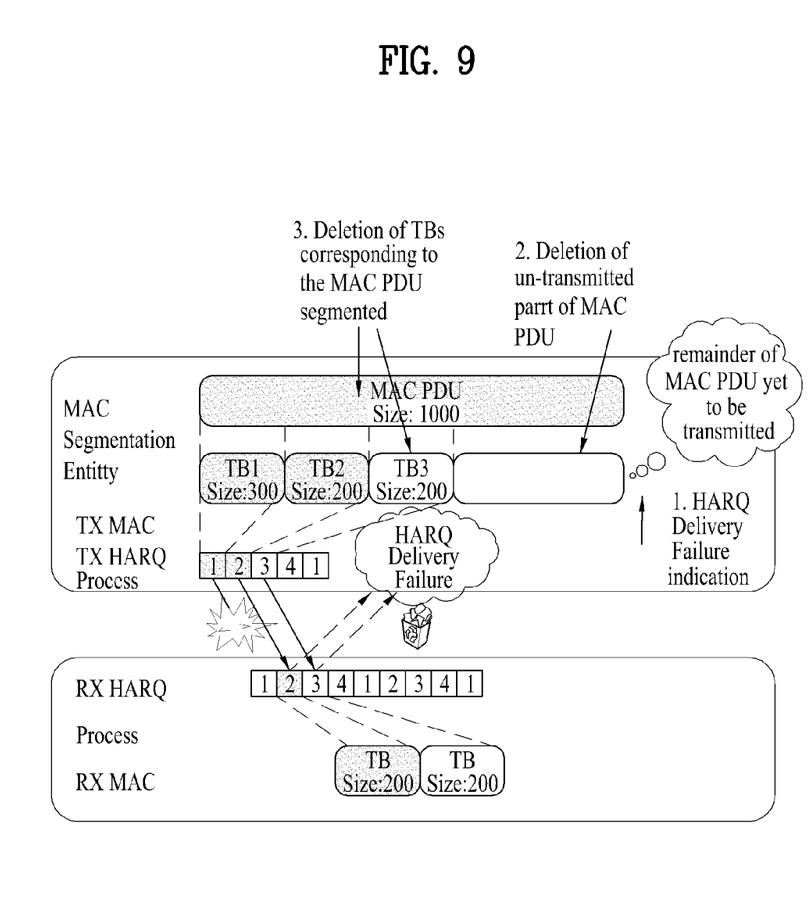
FIG. 9 illustrates an exemplary method for processing a PDU when transmission of a PDU segment is failed.

Referring to FIG. 9, when transmission of the first PDU segment is failed, the MAC layer of the transmitter discards the first PDU segment and notifies the MAC segmentation entity of the HARQ delivery failure of the first PDU segment.

Upon receipt of information indicating the HARQ delivery failure of the first PDU segment, the MAC segmentation entity discards the remainder of the PDU stored in it. The PDU segment buffered in an HARQ process buffer is discarded by the HARQ entity.

If the buffered PDU segment is a part of the PDU including the failed PDU segment, the HARQ entity of the transmitter discards the buffered PDU segment. That is, the HARQ entity should check whether a PDU segment buffered in each HARQ process buffer is from the PDU including the failed PDU segment.

In the case where a PDU is transmitted separately in a plurality of TBs, the transmitter writes the sequence numbers of the first and last PDU segments of the PDU.

Upon transmission failure of a PDU segment, the HARQ entity of the transmitter discards a MAC PDU segment buffered in each HARQ process buffer, if the sequence number of the MAC PDU segment is between the sequence numbers of the first and last PDU segments.

Figure 10:
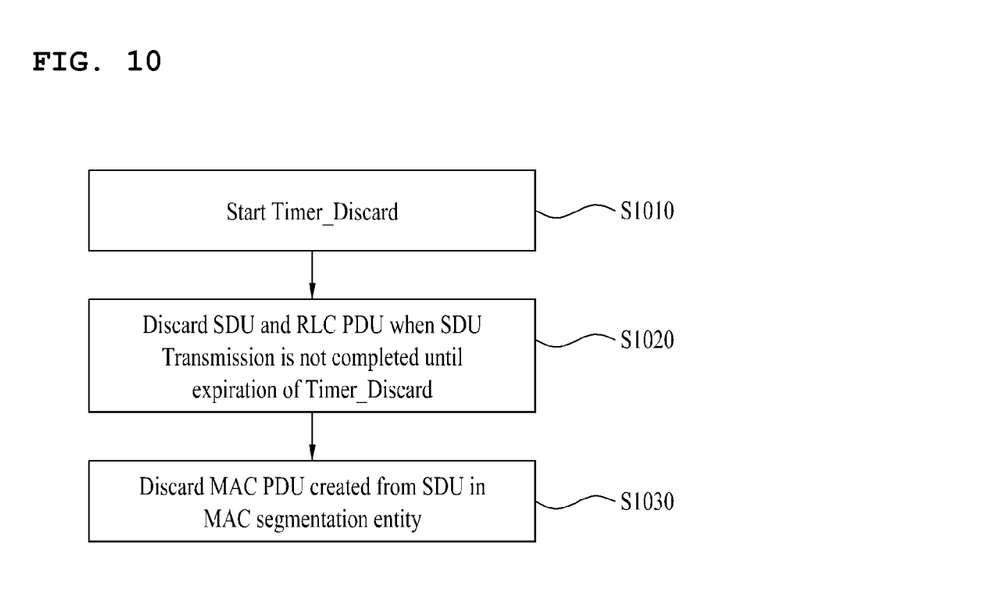
FIG. 10 is a flowchart illustrating a PDU processing method according to another embodiment of the present invention.

Now a description is given of a PDU processing method according to another embodiment of the present invention with reference to FIG. 10. FIG. 10 is a flowchart illustrating a PDU processing method according to another embodiment of the present invention.

In accordance with this embodiment, the transmitter discards an SDU which has not been completely transmitted until expiration of a discard timer Timer_Discard. If a MAC PDU segment created from the discarded SDU is stored in the MAC segmentation entity, the transmitter discards the stored MAC PDU segment.

Referring to FIG. 10, upon receipt of an SDU from a higher layer, the RLC layer of the UE starts a discard timer, Timer_Discard (S1010).

If the UE has not completed transmission of the SDU until expiration of the discard timer Timer_Discard, the UE discards the SDU and clears RLC PDUs created from the SDU from an RLC PDU buffer (S1020).

If a MAC PDU segment created from the SDU is stored in the MAC segmentation entity, the UE discards the MAC PDU segment (S1030).

The RLC layer of the UE determines whether the latest RLC PDU that the RLC layer has transmitted to the MAC layer is from the discarded SDU. The RLC layer updates the sequence number of the latest transmitted RLC PDU each time it transmits an RLC PDU to the MAC layer. If the sequence number of the latest transmitted RLC PDU is one of the sequence numbers of RLC PDUs created out of the discarded SDU, the UE determines that the latest RLC PDU transmitted to the MAC layer is from the discarded SDU.

When determining that the latest RLC PDU transmitted to the MAC layer is from the discarded SDU, the RLC layer transmits to the MAC layer an SDU discard indication indicating that the latest RLC PDU is from the discarded SDU.

Upon receipt of the SDU discard indication, the MAC layer of the UE determines whether there remains any MAC PDU yet to be transmitted in the MAC segmentation entity. In the presence of a MAC PDU segment yet to be transmitted, the UE discards the MAC PDU segment.

After receiving the SDU discard indication, the MAC layer of the UE determines whether there remains any MAC PDU segment yet to be transmitted in the MAC segmentation entity. In the presence of a MAC PDU segment yet to be transmitted, the UE determines whether the MAC PDU segment is from the SDU that has been discarded upon expiration of the discard timer, Timer_Discard. If the MAC PDU segment is from the SDU, the MAC PDU segment is discarded from the MAC segmentation entity.

Figure 11:
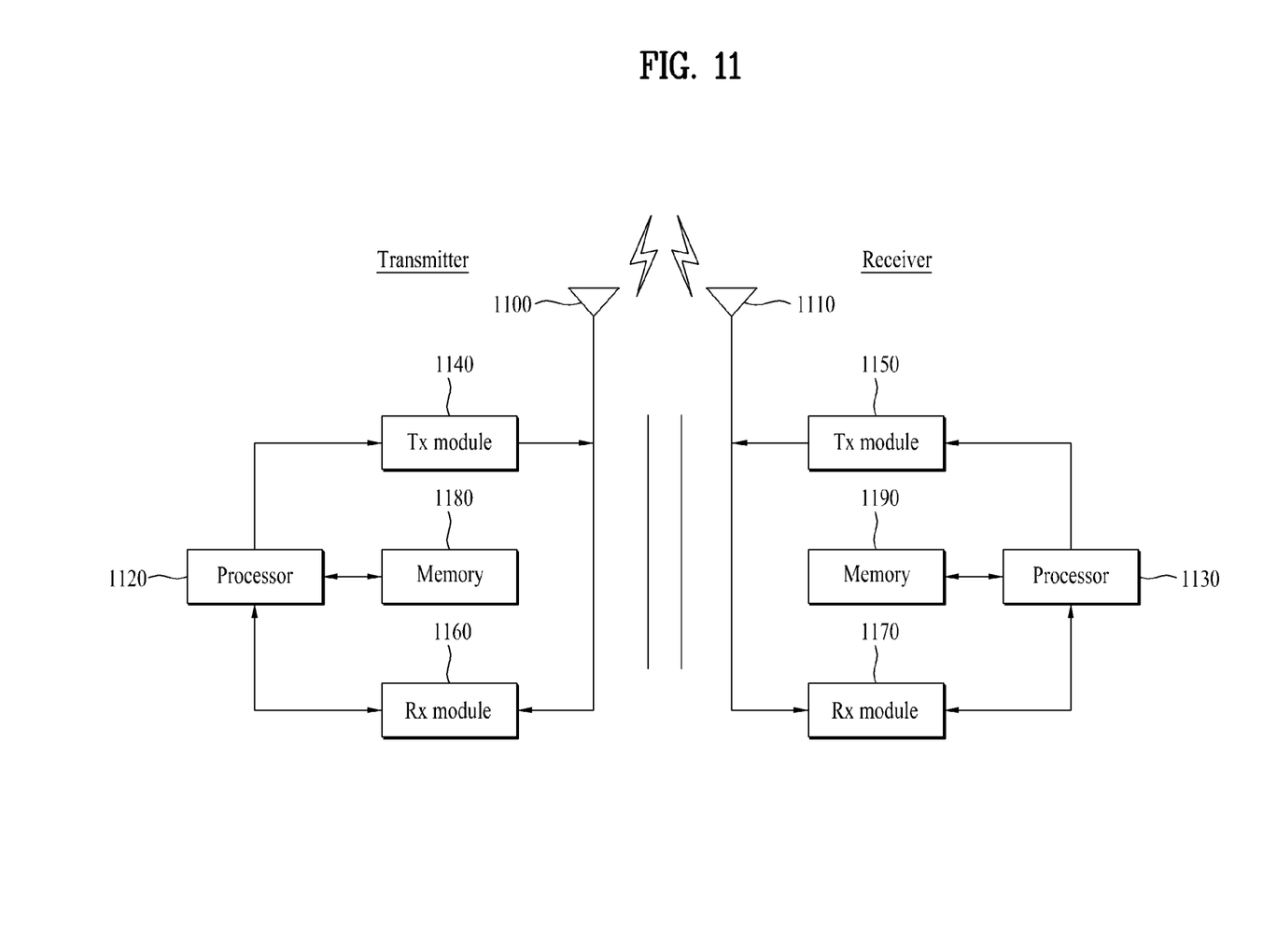
FIG. 11 is a block diagram of a transmitter and a receiver for implementing the PDU processing methods of the embodiments of the present invention, according to an embodiment of the present invention.

FIG. 11 is a block diagram of a transmitter and a receiver for implementing the PDU processing methods of the embodiments of the present invention, according to an embodiment of the present invention.

Referring to FIG. 11, the transmitter and the receiver include Transmission (Tx) modules 1140 and 1150 for transmitting messages by controlling antennas, Reception (Rx) modules 1160 and 1170 for receiving messages by controlling antennas, memories 1180 and 1190 for storing information related to communication with a BS, and processors 1120 and 1130 for controlling the Tx modules 1140 and 1150, the Rx modules 1160 and 1170, and the memories 1180 and 1190.

Antennas 1100 and 1110 transmit signals generated from the Tx modules 1140 and 1150 over the air or transmit signals received over the air to the Rx modules 1160 and 1170. When Multiple Input Multiple Output (MIMO) is supported, each of the transmitter and the receiver may have two or more antennas.

In general, the processors 1120 and 1130 provide overall control to the transmitter and the receiver. Particularly, the processors 1120 and 1130 may perform a control function, a MAC frame conversion control function according to service characteristics and a propagation environment, a handover function, and an authentication and encryption function in order to perform the above-described embodiments of the present invention. In addition, each of the processors 1120 and 1130 may further include an encryption module for controlling encryption of various messages and a timer module for controlling transmission and reception of various messages.

The processor 1120 of the transmitter segments a PDU into a first PDU segment and a second PDU segment each having a size suitable for data transmission in resources, determined taking into account the size of the resources. If transmission of the first PDU segment is failed, the processor 1120 discards the whole PDU.

The processor 1120 includes a MAC segmentation entity for segmenting the PDU into the first and second PDU segments. The MAC segmentation entity transmits the first PDU segment to an HARQ entity of the transmitter. The second PDU segment is stored in the MAC segmentation entity.

The Tx modules 1140 and 1150 may encode and modulate a signal and/or data scheduled by the processors 1120 and 1130 in a predetermined Modulation and Coding Scheme (MCS) and transmit the modulated signal and/or data to the antennas 1100 and 1110.

The Rx modules 1160 and 1170 may recover original data by decoding and demodulating radio signals received through the antennas 1100 and 1110 and transmit the original data to the processors 1120 and 1130.

The memories 1180 and 1190 may store programs for processing and controlling in the processors 1120 and 1130 and temporarily store input/output data (an uplink grant allocated by a BS, system information, a Station Identifier (STID), a Flow ID (FID), an action time, resource allocation information, and frame offset information in a UE).

Also, each of the memories 1180 and 1190 may include at least one of a flash memory-type storage medium, a hard disc-type storage medium, a multimedia card micro-type storage medium, a card-type memory (e.g. a Secure Digital (SD) or extreme Digital (XS) memory), a Random Access Memory (RAM), a Static RAM (SRAM), a Read-Only Memory (ROM), an Electrically Erasable Programmable Read-Only Memory (EEPROM), a Programmable Read-Only Memory (PROM), a magnetic memory, a magnetic disc, and optical disk.

As is apparent from the above description of the embodiments of the present invention, radio resources can be efficiently used and a time delay can be prevented.

Those skilled in the art will appreciate that the present invention may be carried out in other specific ways than those set forth herein without departing from the spirit and essential characteristics of the present invention. For example, those skilled in the art may combine components of the above-described embodiments of the present invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. A method for processing a Medium Access Control (MAC) Protocol Data Unit (PDU) at a MAC layer of a transmitter in a wireless communication system, the method comprising:

segmenting a MAC PDU into a plurality of PDU segments defined by sequence numbers;

storing the sequence numbers of the first and last PDU segments of the MAC PDU;

transmitting the plurality of PDU segments to a receiver; and discarding a PDU segment buffered in each HARQ process buffer if one of the plurality of PDU segment transmissions is failed and if a sequence number of the PDU segment buffered in each HARQ process buffer is between the sequence numbers of the first and last PDU segments.

2. The method according to claim 1, wherein the segmentation comprises segmenting the MAC PDU according to an amount of available resources.

3. The method according to claim 2, wherein the available resources are determined according to a Transport Block (TB) size.

4. The method according to claim 3, wherein the available resources are determined according to space of the TB determined by a selected Transport Format Combination (TFC).

5. A transmitter including a Medium Access Control (MAC) layer in a wireless communication system, the transmitter comprising:

a segmentation entity configured to:
   segment a MAC PDU into a plurality of PDU segments defined by sequence numbers; and
   store the sequence numbers of the first and last PDU segments of the MAC PDU; and a transmission entity configured to transmit the plurality of PDU segments to a receiver, wherein, if one of the plurality of PDU segment transmissions is failed, and if a sequence number of a PDU segment buffered in each HARQ process buffer is between the sequence numbers of the first and last PDU segments, the PDU segment buffered in each HARQ process buffer is discarded.

6. The transmitter according to claim 5, wherein the segmentation entity segments the MAC PDU according to an amount of available resources.

7. The transmitter according to claim 6, wherein the available resources are determined according to a Transport Block (TB) size.

8. The transmitter according to claim 7, wherein the available resources are determined according to space of the TB determined by a selected Transport Format Combination (TFC).

9. The transmitter according to claim 5, wherein the transmission entity is a Hybrid Automatic Repeat reQuest (HARQ) entity.

* * * * *